April 22, 1930. W. STANLEY 1,755,195
FISHING REEL
Filed Oct. 28, 1927 2 Sheets-Sheet 1

Walter Stanley
Inventor
by Edw. Evanlinsky
his Attorney

April 22, 1930. W. STANLEY 1,755,195
FISHING REEL
Filed Oct. 28, 1927 2 Sheets-Sheet 2

Walter Stanley
Inventor
By Edw. Dombrinsky
his Attorney

Patented Apr. 22, 1930

1,755,195

UNITED STATES PATENT OFFICE

WALTER STANLEY, OF LUTTERWORTH, ENGLAND

FISHING REEL

Application filed October 28, 1927, Serial No. 229,505, and in Great Britain October 30, 1926.

This invention relates to fishing reels of the kind having a spool carrying a light line which is driven through a friction clutch so loaded as to slip when the pull on the line approaches its tensile limit. The chief object of the invention is to provide an effective construction which is very inexpensive and reliable, and which will possess detail advantages over existing reels of this type.

Figure 1:
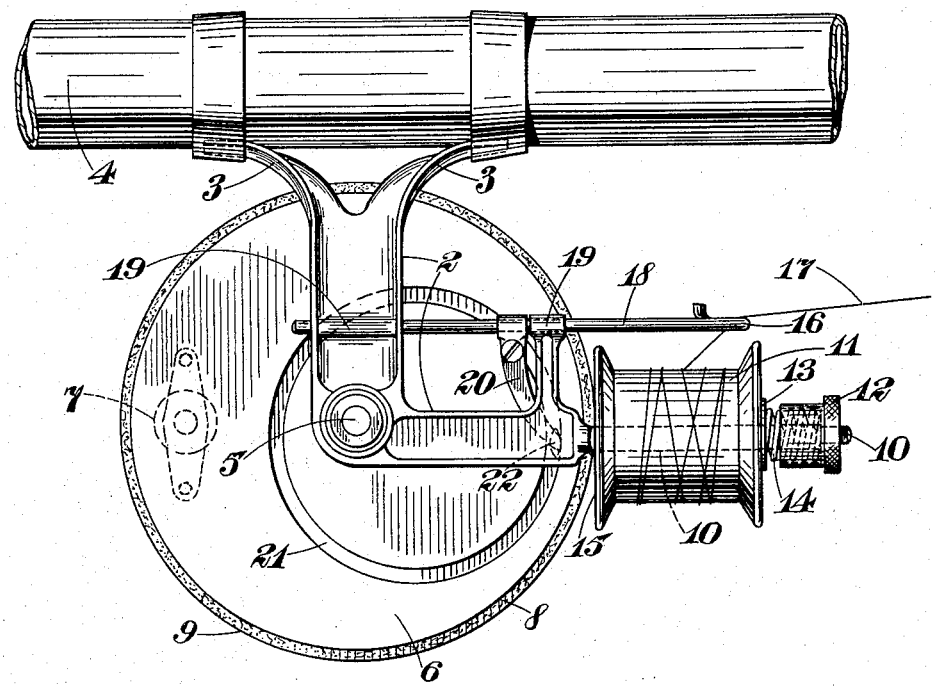
Figure 2:
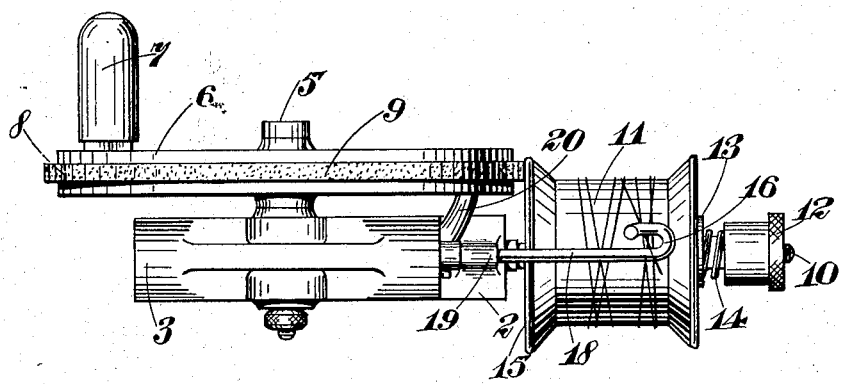
Figure 3:
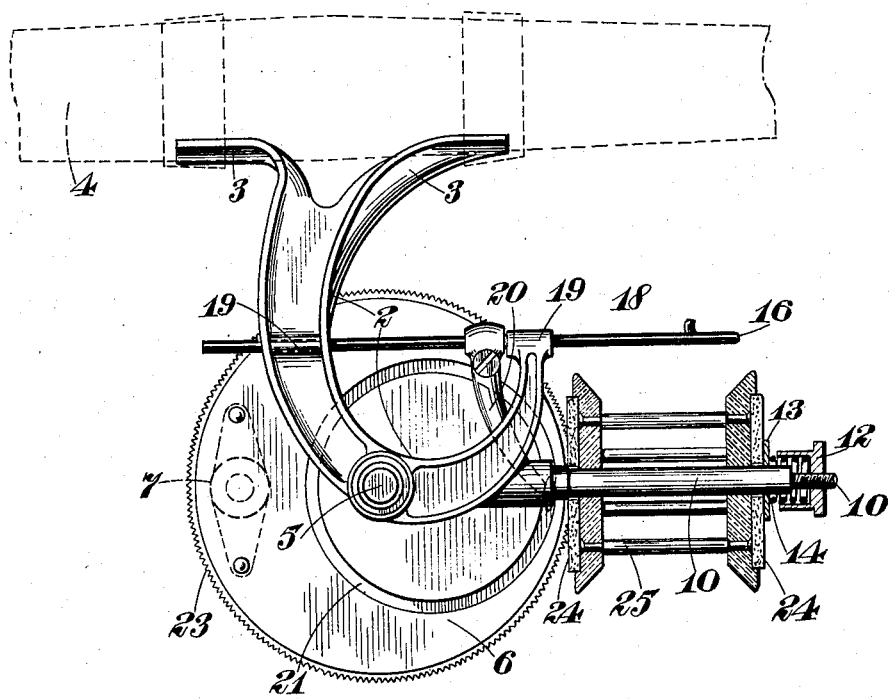
Figure 4:
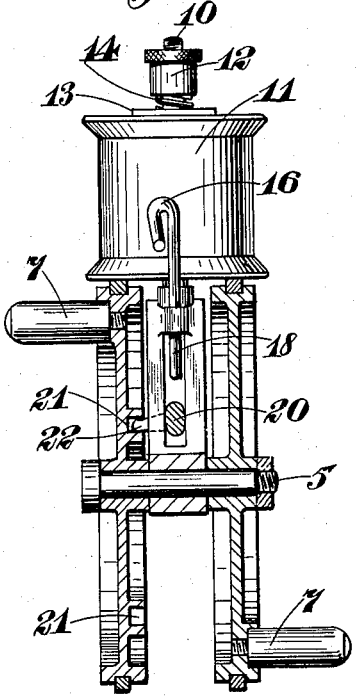

The manner of carrying out the invention is illustrated in the accompanying drawings, in which Figure 1 is an elevation of the reel showing a portion of the rod, Figure 2 is a plan with the rod removed, Figure 3 is an elevation showing an alternative construction, and Figure 4 is a plan of a further modification.

Like numerals indicate like parts throughout the drawings.

In each construction illustrated, there is a bracket 2, either of L-shape or a modification thereof, with lugs 3 or the like for the attachment to the rod 4. At a suitable point in the bracket is a bearing or bearing pin 5 for the rotatable disc 6. The latter carries a projecting knob or handle 7 whereby it can be rotated, and its periphery is of some suitable nature to function as a friction driving member. In this example it is grooved at 8 and in this groove is fitted a rubber or other band 9, preferably one of rectangular section.

The free end of the L-shaped bracket terminates in or carries substantially parallel with the rod a stationary stem 10, upon which is mounted the spool 11. The end of the stem is threaded and receives a recessed nut 12 within and between which and a washer 13 bearing on the spool is a light spring 14. The spring therefore presses the underside 15 of the spool down upon the periphery of the disc 6, so that as the latter is rotated the spool is revolved, but if excessive resistance is afforded to the revolution of the spool the drive between the edge of the disc and the spool will slip.

Any suitable guide 16 may be used, around which the line 17 issuing from the reel is passed before it travels up the rod, and in use it will be understood that the line can run freely off the spool, and can be wound in freely as long as the tension on the line does not exceed a certain figure. When this tension is exceeded, the frictional drive between the disc and the spool slips, and the line is safeguarded against fracture.

The spool 11 as illustrated is an ordinary cotton reel carrying cotton or some other similar material of a suitable type and strength for the purpose.

It is preferred that the guide 16 should reciprocate across the peripheral face of the spool to lay the line over the whole width of the spool. This may be effected by an angular movement if the guide, or by employing a rod 18, terminating in a guide 16 formed as an open hook of suitable shape, and causing this rod to reciprocate in guides 19 carried by the bracket 2 and providing upon it an arm 20 adapted to engage with a cam face or cam groove 21 on the disc 6.

The groove shown is of circular form turned in the disc eccentric to the latter's axis and engaged by a peg 22 on the arm 20, this latter being clipped to the hooked rod 18.

When casting, the line is disengaged from the hook 16 and can run freely off the spool, but when winding in the operator slips the line into the guide hook, which can easily be done.

In Figure 3 is shown a modified construction in which the disc 6 is provided with a milled or finely toothed edge 23 instead of the groove 8 and rubber ring 9. The end of the spool which it engages is preferably faced with a disc 24 of yielding material fast with the spool and adapted to give, under the pressure of the spring 14, a desired driving effect between the disc and the spool. To enable the spool to be endwise reversible upon its stem 10, both ends may be provided with the facings 24.

In this construction the bracket 2 may be modified in the manner shown so as to provide an easy curve between its attachment to the rod and the position at which the stem 10 is mounted. The curve may be extended to provide for the guide 19 in which the rod 18 reciprocates. In this construction the spool is of skeleton form constituted by a pair of end discs connected by rods 25 spaced in a circle around the axis of the spool.

In the construction shown in Figure 4, two discs are employed to engage frictionally with the reel and are arranged one on each side of its axis, thereby providing for a left hand or right hand drive. In this case only one of the discs would be provided with a cam slot or other means for traversing the guide hook.

Preferably the bracket 2 is a light aluminum casting, and all parts as far as possible are made of aluminum, though any other suitable metal, or vulcanite, may be used. In the single disc construction they may also be designed so that the parts are reversible, to enable them to be used to build up a left-hand or a right-hand reel.

If two independent discs are employed as in Figure 4 the bracket may be slotted, with the arm attached to the guide hook passing through the slot. In some cases the acting end face of the spool may be surfaced with sandpaper or similar material of a suitable nature to increase the friction.

As will be evident the reel may be rotated either clockwise or anti-clockwise when fitted either for right hand or left hand position on the rod of the disc 6. If necessary the spool can then be turned end for end on its stem 10 to give a normal direction of rotation for winding-in suitable to the individuality of the user.

By this means a very simple and inexpensive reel of the kind referred to is provided.

What I claim as my invention and desire to secure by Letters Patent of the United States is:—

1. In a fishing reel, the combination of a rod, a stem carried thereby and substantially parallel with said rod, a spool rotatably mounted upon said stem and also endwise free thereon, a disc rotatable by the user engaging an end face of said spool, and a spring acting on said spool to thrust it resiliently into driving engagement with said disc, substantially as set forth.

2. In a fishing reel, the combination of a rotatably mounted spool, a disc rotatable by the user which has a frictional driving engagement with an end face of said spool adapted to slip when the load on the line exceeds a prearranged amount, means to guide the line to-and-fro over the peripheral face of the spool comprising a traversing device reciprocated through an operative connection with the disc, by forming or providing a cam in the face of the disc and engaging the device therewith, substantially as set forth.

3. In a fishing reel, the combination of a rotatably mounted spool, a disc rotatable by the user which has a frictional driving engagement with said spool, both said spool and disc supported on a bracket such as 2 adapted to be clipped to the rod, and to support slidably a traversing device for the line, substantially as set forth.

4. A fishing reel as claimed in claim 3, in which a pair of discs are mounted in driving engagement with the spool, one on each side of the latter's axis and are each provided with an independent operating handle, substantially as set forth.

In testimony whereof I have signed my name to this specification.

WALTER STANLEY.